United States Patent [19]

Kurokawa et al.

[11] 3,724,870
[45] Apr. 3, 1973

[54] GAS-PRODUCING DEVICE FOR AN INFLATABLE BODY-PROTECTING BAG ON A HIGH-SPEED VEHICLE

[75] Inventors: Isoa Kurokawa; Nobuyuki Izawa; Shunji Orita, all of Nobeoka, Japan

[73] Assignee: Asahi Kasei Kogyo Kabushiki Kaisha, Osaka, Japan

[22] Filed: Feb. 16, 1971

[21] Appl. No.: 115,332

[30] Foreign Application Priority Data

Feb. 18, 1970 Japan ................................. 45/13458
May 20, 1970 Japan ................................. 45/42388
May 20, 1970 Japan ................................. 45/42389

[52] U.S. Cl. .............................. 280/150 AB, 102/39
[51] Int. Cl. ....................... B60r 21/08, B60r 21/10
[58] Field of Search ............. 280/150 AB; 102/40, 39

[56] References Cited

UNITED STATES PATENTS

| | | | |
|---|---|---|---|
| 3,532,359 | 10/1970 | Teague et al. | 280/150 AB |
| 2,072,671 | 3/1937 | Foulke | 102/40 |
| 117,388 | 7/1871 | Crary | 102/40 |
| 3,560,018 | 2/1971 | Goetz | 280/150 AB |
| 2,850,291 | 9/1958 | Ziccardi | 280/150 AB |
| 2,931,665 | 4/1960 | Sandor | 280/150 AB |
| 3,336,045 | 8/1967 | Kobori | 280/150 AB X |
| 3,618,976 | 11/1971 | Leising | 280/150 AB |
| 392,922 | 11/1888 | Johnson et al. | 102/40 |
| 385,603 | 7/1888 | Ewbank et al. | 102/40 |

*Primary Examiner*—Kenneth H. Betts
*Assistant Examiner*—John P. Silverstrim
*Attorney*—Oldham & Oldham

[57] ABSTRACT

A gas-producing device is provided which includes a number of gas-producing tubes containing gas-producing composite material including an explosive and/or a combustible compound. The tubes, having different time durations of combustion are cooperable so as to inflate the body-protecting bag within at most 50 msec and to maintain it in its inflated state for a definite period of time, for example, 500 msec. The gas-producing device also includes improvements effective to stabilize the operation of the gas-producing tubes and the inflation of the body-protecting bag associated therewith.

6 Claims, 13 Drawing Figures

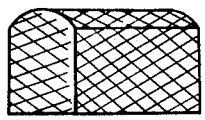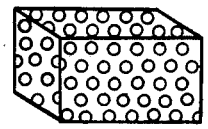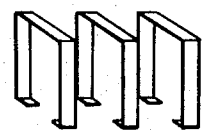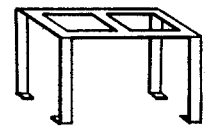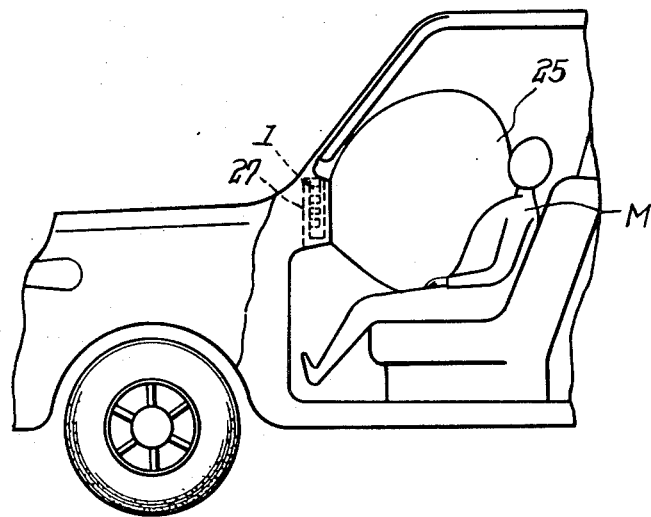

DETAILED DESCRIPTION OF THE INVENTION

Description will now be made in detail of the present invention with reference to the accompanying drawings, which illustrate some preferred embodiments of the invention and in which:

FIGS. 8, 8A, 8B and 8C are perspective views illustrating respective modifications of the frame shown in Fig. 7; and FIG. 9 is a fragmentary cross-sectional side elevation of an automobile equipped with a gas-producing device of the invention illustrating the associated body-protecting bag in a state inflated upon operation of the device.

Figure 1:
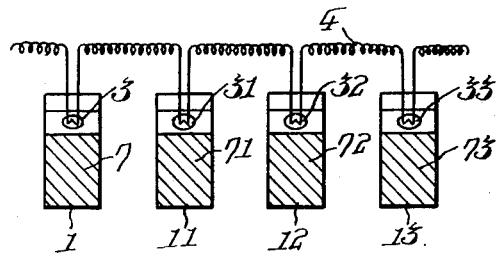
FIG. 1 is a longitudinal cross-sectional view of one embodiment of the invention including a plurality of gas-producing tubes.
Figure 2:
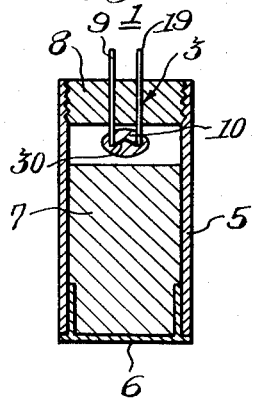
FIG. 2 is an enlarged longitudinal cross section of one of the gas-producing tubes shown in FIG. 1.

Referring first to FIG. 1, reference numerals 1, 11, 12 and 13 indicate respective gas-producing tubes having different time durations of gas production and comprised of respective gas-producing compounds 7, 71, 72 and 73. Reference numeral 3, 31, 32 and 33 indicate electric ignitors arranged in respective gas-producing tubes 1, 11, 12 and 13 and electrically connected in series by conductor means 4. As shown in FIG. 2, each of the gas-producing tubes includes a tubular casing 5 made of polyethylene, a closure plate 6 fitted in the casing 5 at its one end, and a charge of gas-producing compound 7 loaded in the casing 5, said electric ignitor 3 being fitted in the other end of the casing 5, as shown. The electric ignitor 3 is comprised of an electrically insulating closure 8 adapted to fit in the adjacent end of the casing 5, a pair of electrodes 9 and 19 held by and extending through the closure 8, a high-resistance wire 30 connected across the inner ends of electrodes 9 and 19 and serving to produce heat when current is conducted therethrough, and a primer charge or initiator 10 cemented to and enclosing the high-resistance wire 30.

In operation of the gas-producing tube 1 (11, 12, 13) constructed as described above, current is conducted through the electrodes 9 and 19 of the ignitor 3 to energize the high-resistance wire 30 and the heat thus produced by the latter acts to ignite the primer charge 10. The flame formed by the charge ignited reacts with the gas-producing compound 7 (71, 72, 73) to cause the latter to burn producing combustion gases. On this occasion, the gas pressure formed in the tube casing 5 acts to dislodge the closure plate 6 therefrom, allowing the combustion gases produced to flow rapidly out of the casing 5.

Gas-producing compound 7 may alternatively be molded into form with use of an appropriate bonding agent instead of being packed into a tubular casing as described above or may be encased in a bag of polyethylene or the like material as a cartridge.

For use, the plurality of gas-producing tubes 1, 11, 12 and 13 formed as described above are arranged in a body-protecting bag and usually fixed to a support plate provided inside thereof. They may also be adhesively secured directly to the body-protecting bag inside thereof or be arranged in a gas-producing vessel which communicates with the interior of the body-protecting bag through a connecting pipe for the purpose of supplying gases to the bag.

The gas-producing compound usable in the present invention may be selected from the group of explosives including black powder, smokeless powder, and composite propellants or may be a combustible compound comprised of at least one kind of metal reducing agent selected from the group including zirconium, magnesium, boron, aluminum, silicon and silicon iron and at least one kind of oxidizer selected from the group including potassium perchlorate, potassium chlorate, potassium bromate, potassium nitrate, ammonium perchlorate, barium nitrate, barium peroxide, triplumbic tetroxide, lead peroxide, lead oxide, and lead chromate, or a combustible compound comprising any of explosives or combustible compounds listed above as a main ingredient and an appropriate organic substance mixed therewith as a gas-producing agent, or may be a mixture of any of explosives listed above and any of combustible compounds mentioned above. In either case, the gas-producing composition is a compound material that exhibits a rapid burning reaction evolving suitable gases as a product of combustion.

According to the present invention, the plurality of gas-producing tubes 1, 11, 12 and 13 are arranged to cooperate with each other so as to inflate a body-protecting bag within about 50 msec from the instant of energization of the gas-producing device and to maintain the bag in its inflated state for about 500 msec. For example, the first gas-producing tube 1 is made to produce gases effective to inflate the body-protecting bag for a predetermined period of time, e.g., of 3 to 20 msec immediately after the instant of collision of the vehicle equipped with the device; the second tube 11, for a time period of 15 to 50 msec; the third tube 12, for a time period of 40 to 200 msec; and the fourth tube 13, for 180 to 500 msec. Such gas-producing tubes may incorporate a combination of gas-producing compounds as described below.

The gas-producing compounds of the gas-producing tubes are usually comprised of an explosive and a combustible compound and their burning velocity is varied with the compounding ratio of the explosive and the combustible compound. In this case, a plurality of gas-producing compositions giving different time duration of gas production effective to inflate the associated body-protecting bag may be employed in combination for the respective gas-producing tubes. Alternatively, gas-producing compositions comprised of combustible

GAS-PRODUCING DEVICE FOR AN INFLATABLE BODY-PROTECTING BAG ON A HIGH-SPEED VEHICLE

BACKGROUND OF THE INVENTION

In recent years, increase in volumes of road traffic is remarkable and is causing rapid increase in the rate of automobile accidents, thus posing a serious social problem. In order to meet this situation, various forms of protecting device have been proposed which are intended to protect the body or life of the automobile rider in colliding accidents. For example, the U.S. Pat. No. 3,336,045 discloses a body-protecting bag designed to support the rider's body under control of a special safeguard means, which is started to operate at the instant of a rear-end or other collision accident. Such body-protecting bag is inflatable by means of a gas-producing device which includes a high pressure vessel charged with liquefied Freon gas and a fuse or initiating unit loaded with black powder or other explosive initiator material and arranged in the interior of the high pressure vessel. Explosion of the initiator material will cause gasefication of the liquefied Freon gas to produce high pressure gases enough to inflate the body-protecting bag rapidly.

The gas-producing device, however, involves, in cases where it is equipped on the body-protecting bag for operation, various disadvantages such as high sound pressure due to the bag inflation liable to impair the rider's auditory sense, production of a large amount of smoke and that of a very offensive smell, and scattering of small iron fragments of the vessel bursted, which possibly causes damage of the body-protecting bag incurring the danger of injuring the human body.

Other types of gas-producing device previously proposed utilize compressed air or compressed nitrogen gas but have not been put into practical use because of various problems involved, including the space required to accommodate the gas vessel, the sound pressure occurring upon operation of the device, and the variation of pressure in the vessel with the environmental temperature.

According to another proposal previously made, which does not make use of any high pressure gas, gas-producing composite material comprised of a sheet, film or granular form of explosive and/or combustible compound is adhesively secured on to the internal surface of an inflatable body-protecting bag in a dispersed state, for example, in the form of lines, strips, spots, or faces of extended area. Such arrangement is the one disclosed in the Japanese Pat. No. 544,375 of the applicant and includes an electric ignitor which is operable upon collision of the high speed vehicle equipped with the device to ignite the gas-producing compound. It will be apparent that the material thus ignited produces combustion gases effective to inflate the body-protecting bag.

In this case, the combustion gases from the gas-producing compound are initially at an elevated temperature but subsequently are rapidly reduced in volume with fall of their temperature. This obviously means that the body-protecting bag can be inflated in an instant but that the inflated bag is allowed to contract in a very short period of time.

On the other hand, in a collision of a high speed vehicle such as an automobile, the time lapse between the instant of collision and the instant of so-called secondary collision, i.e., the instant when the rider thrown forward comes into direct striking engagement with the interior equipment of the vehicle lying in his front, is generally from about 50 msec to about 500 msec, depending upon the speed of the colliding vehicle and other factors. In other words, the time lapse before the secondary collision is relatively short or long when the vehicle comes into collision at a relatively high or low speed, respectively.

Under these circumstances, it is necessary that the body-protecting bag be inflated within at most 50 msec and maintain its inflated state for about 500 msec. However, in cases where gas-producing compound material including an explosive and/or a combustible compound is utilized to inflate the body-protecting bag with gases from combustion of the material, it has previously been impossible to enable the inflated bag to maintain its inflated state for the required period of time because of the arrangement used.

SUMMARY OF THE INVENTION

The object of the present invention is to eliminate the abovedescribed deficiencies involved in previous forms of gas-producing device and to provide a novel gas-producing device which utilizes combustion gases of gas-producing compound material including an explosive and/or a combustible compound for rapid inflation of a body-protecting bag and is capable of maintaining the inflated bag in its inflated state for a period of time required.

Another object of the invention is to stabilize the combustion of the gas-producing compound material.

i. further object of the invention is enable the body-protecting bag once inflated to remain inflated for a required time with no variations in pressure.

According to the present invention, there is provided a gas-producing device usable with a body-protecting bag on a high speed vehicle and adapted to utilize combustion gases from gas-producing compound material including an explosive and/or a combustible compound to inflate the body-protecting bag, said device comprising gas-producing means comprised of a plurality of gas-producing tubes having different time durations of gas production and operable to inflate the bag within a desired period of time from the instant of collision of the high speed vehicle and subsequently to maintain the inflated bag in that state for a predetermined period of time.

The gas-producing tubes of the device of the present invention, differing in the time duration of gas production, may take either of two forms. In one form, the tubes are packed or loaded with respective gas-producing compound materials differing from each other in burning velocity while in the other form they include delaying means in the form of respective delaying compounds differing from each other in burning velocity. Gas-producing materials usable in the former form of gas-producing tubes may include the same ingredients but in different proportions or compounding ratios, or may include different ingredients in appropriate compounding ratios. On the other hand, delaying compounds usable in the latter form of tubes may also include the same ingredients in different compounding ratios or include different ingredients in appropriate compounding ratios.

compounds may be employed by varying the compositions of the respective combustible compounds and hence the burning velocities thereof from each other to give different time durations of gas production effective to inflate the body-protecting bag.

The plurality of gas-producing tubes 1, 11, 12, 13 formed as described above are arranged in a body-protecting bag to be inflated with electric ignitors 3, 31, 32 and 33 fitted in the respective tubes and connected in series with an appropriate current source. It will be apparent that when current is applied to the electric ignitors, the gas-producing compositions 7, 71, 72 and 73 forming the respective gas-producing tubes 1, 11, 12 and 13 are caused to burn rapidly and the combustion gases thus produced act rapidly to inflate the body-protecting bag. On this occasion, the gas-producing tubes 1, 11, 12 and 13, which include respective gas-producing compounds 7, 71, 72 and 73 differing from each other in time duration of gas production, produce gases when ignited successively in the order of 1, 11, 12 and 13, the gas production continuing from the instant when the gas-producing compound 7, having the highest burning velocity, has started to burn to the time when the combustion of the gas-producing compound 73 of the lowest burning velocity is completed. In other words, the body-protecting bag is first inflated with gases produced by the gas-producing tube 1 and then maintains its inflated state without any volume contraction until the gas production of the final gas-producing tube 13 is ended.

Figure 3:
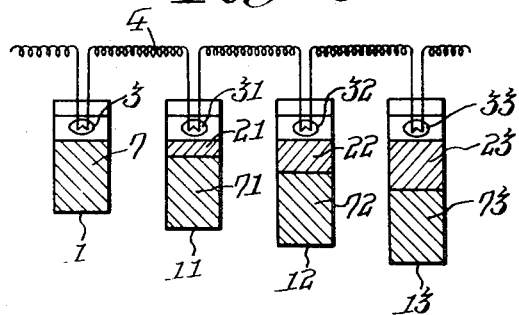
FIG. 3 is a view similar to FIG. 1 illustrating a modification of the embodiment shown in FIGS. 1 and 2.

FIG. 3 illustrates another embodiment of the invention including a plurality of gas-producing tubes 1, 11, 12 and 13 having different time durations of gas production. One of the tubes 1 is comprised only of a gas-producing compound 7 while the remaining tubes 11, 12 and 13 include in addition to respective gas-producing compounds 71, 72 and 73 respective delaying compounds 21, 22 and 23, which differ from each other in delay time. The tubes 1, 11, 12 and 13 also include respective electric ignitors 3, 31, 32 and 33 interconnected by conductor means 4 for energization. In this embodiment, the gas-producing tubes are so designed in relation to each other that the combustion time of the gas-producing compound 7 of tube 1 is equal to that of the delaying compound 21 included in tube 11, that the combustion time of the delaying compound 22 in tube 12 is equal to the total combustion time of the gas-producing compounds 7 and 71 of tubes 1 and 11 and the delaying compound 21 of the tube 11, and that the combustion time of the delaying composition 23 contained in the final tube 13 is equal to the total combustion time of the gas-producing and delaying compounds 7, 71, 72 and 21, 22 contained in tubes 1, 11 and 12. With such arrangement, it will readily be recognized that the gas-producing compositions 7, 71, 72 and 73, forming respective gas-producing tubes 1, 11, 12 and 13, are caused to burn successively, in combination producing gases without interruption.

Figure 4:
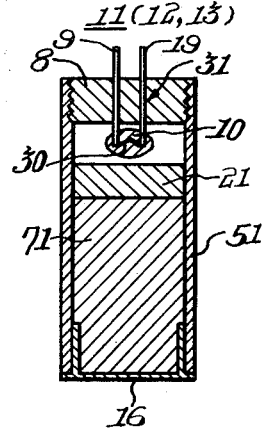
FIG. 4 is an enlarged cross-sectional view of one of the gas-producing tubes shown in FIG. 3.

FIG. 4 illustrates on an enlarged scale one of the gas-producing tubes II (12, 13) of the embodiment of FIG. 3 which includes delaying compound 21. As shown, the tube includes a tubular casing 51 of polyethylene, a closure plate 16 fitted in one end of the casing 51, charges of gas-producing and delaying compounds 71, and 21 loaded one after the other in the casing, and an electric ignitor 31 fitted in the other end of the casing 51 and formed similar to that illustrated in FIG. 2.

With the gas-producing tube constructed as described above, when current is fed through the electrodes 9 and 19 of the electric ignitor 31, the high-resistance wire 30 is heated to ignite the surrounding initiator 10, which is thus inflamed to cause the delaying compound 21 to burn until finally its flame acts on the gas-producing compound 71 to start its combustion for gas production. The resulting gas pressure built up in the casing 51 acts to dislodge the closure plate 16 thereby releasing the gaseous product of combustion exteriorly of the casing 51.

Figure 5:
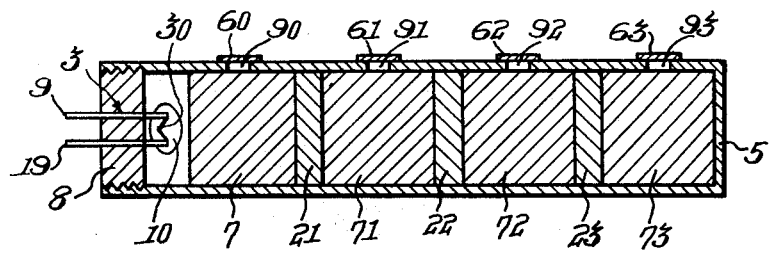
FIG. 5 is a view similar to FIGS. 1 and 3 of another embodiment of the invention.

Another form of gas-producing device of the invention is shown in FIG. 5. As shown, the gas-producing device includes a single cartridge 5 loaded with gas-producing and delaying compounds and in effect corresponds to a device including a plurality (four) of gas-producing tubes. That is, in the cartridge 5 are loaded gas-producing compounds 7, 71, 72 and 73 and delaying compounds 21, 22 and 23 in an alternate fashion, enabling the device to function substantially in the same manner as the gas-producing device shown in FIGS. 3 and 4. In this instance, only one electric ignitor 3 is required and, when it is energized to ignite the primer charge or initiator 10, the gas-producing and delaying compounds are caused, by the flame of the initiator ignited, to start to burn successively in an alternate fashion. As the result, the combustion gases of the gas-producing compounds act to break respective sealing plates 60, 61, 62 and 63, fitted to the cartridge casing 5 and covering respective orifices 90, 91, 92 and 93 formed therein, and jet out through the respective orifices exteriorly of the casing 5.

As will readily be understood, the delaying compounds 21, 22 and 23 used in the embodiment of FIG. 5 are intended to control the time of gas production of the gas-producing compounds 71, 72 and 73, which are loaded adjacent to the respective delaying compounds in the cartridge 5. The gas-producing compounds 7, 71, 72 and 73 may therefore be either the same or different in burning velocity. It is, however, required that at least the gas-producing compound 7 used as the first gas-producing tube be the highest in burning velocity like the gas-producing compound used in the first gas-producing tube 1 of the embodiment of FIG. 1.

The composition of the delaying charges may be selected from the known group of delaying compositions used in electric detonators and is usually a mixture of a metal reducing agent such as boron, silicon, silicon iron, antimony or antimony trisulfide and an oxidizer such as triplumbic tetroxide, lead peroxide, lead chromate, barium peroxide or potassium permanganate, or such mixture blended with a combustible material, or a mixture of any of said oxidizers listed above and a combustible material.

In use, the plurality of gas-producing tubes in each of the embodiments described are arranged in a body-protecting bag to be inflated and, when the electric ignitor or ignitors connected to an appropriate current source are energized, the gas-producing compounds 7, 71, 72 and 73, forming the respective gas-producing tubes, are caused immediately to burn or deflagrate producing combustion gases effective to rapidly inflate the body-protecting bag.

In this connection, it is to be noted that, since the gas-producing compounds such as 7, 71, 72 and 73 arranged with or without delaying compounds are designed to burn consecutively in that order, the device operates to produce gases continuously from the instant when the first gas-producing tube 1 is started to produce gases to the time when the combustion of the gas-producing compound 73 of the final gas-producing tube 13 is completed. In other words, with the gas-producing device of the invention, the body-protecting bag once inflated by combustion gases from the first gas-producing tube 1 of the device can maintain its inflated state for a period of time at least extending until the combustion of the gas-producing compound 73 of the final gas-producing tube 13 is ended.

Though in the embodiments described hereinbefore four gas-producing tubes are employed, it will be apparent that the number of such gas-producing tubes can be freely selected according to the time durations of gas production to be set for the respective tubes.

As described hereinbefore, the plurality of gas-producing tubes of the device of the present invention are usually arranged within the associated body-protecting bag or on a support plate on which the bag is mounted. With such arrangement, it has been ascertained that the device generally functions satisfactorily but in some cases certain difficulties have been experienced as described below. In one instance, the gas-producing charges in some gas-producing tubes could not burn out as during combustion these charge portions which were yet to burn were scattered and remained unburnt. In another instance, combustion obtained was unstable as the flame formed on one gas-producing tube acted upon the other gas-producing tube or tubes to cause combustion thereof. Further, in some instances, it was often impossible to impart a stable inflated state to the body-protecting bag owing to variations occurring in gas pressure therein. In order to overcome these difficulties, the inventors have made further improvements in the gas-producing device.

Figure 6:
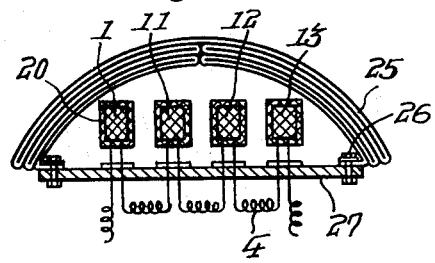
FIG. 6 is a longitudinal cross-sectional view of a further embodiment of the present invention including a plurality of gas-producing tubes arranged in a body-protecting bag and each enclosed with a porous material.
Figure 6A:
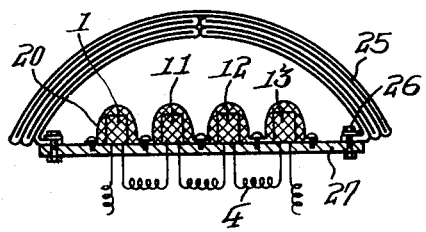
FIG. 6A is a view similar to FIG. 6, illustrating a modification of the embodiment shown in FIG. 6.

FIGS. 6 and 6A illustrate such improved modifications of the present device. In these figures, reference numerals 1, 11, 12 and 13 indicate respective gas-producing tubes having different time durations of gas production and each enclosed by an envelope 20 such as of wire netting or perforated sheet. Reference numeral 4 indicates a wiring connecting the electrodes of the electric ignitors fitted to the respective gas-producing tubes; and 25 indicates an inflatable bag secured to a support plate 23 as by bolt and nut means 26 and shown in a collapsed state.

In the modification of FIG. 6, the gas-producing tubes 1, 11, 12 and 13 are each wrapped by a tubular wire netting 20, whereas in the modification of FIG. 6A they are wrapped by a capping wire netting 20 secured to the support plate 23.

Experiments conducted by the inventors with the embodiment of FIG. 6 or 6A have shown that by energizing the electric ignitors not only the gas-producing compounds in the tubes can be caused to burn in a manner to inflate the body-protecting bag within at most 50 msec but also the combustion can be maintained in a stable state for about 500 msec while effectively preventing any scattering of the unburnt portions of gas-producing compounds or premature burning of the later-stage tubes.

Figure 7:
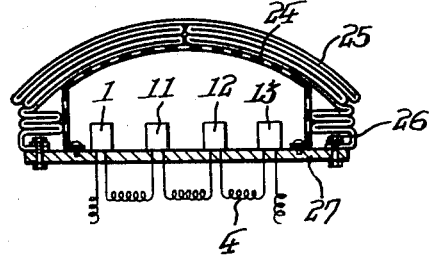
FIG. 7 is a view similar to FIGS. 6 and 6A, illustrating another embodiment of the invention which includes a plurality of gas-producing tubes accommodated in a common porous frame secured in a body-protecting bag.

FIG. 7 illustrates a further improved embodiment of the invention, in which the plurality of gas-producing tubes 1, 11, 12 and 13 is enclosed in a single frame or casing formed of wire netting or perforated sheet 24. The body-protecting bag 25 is secured to a support plate 27 by bolt and nut means 26 and when collapsed is brought into contacting engagement with the periphery of the frame 24, as shown.

FIGS. 8, 8A, 8B and 8C illustrate the respective forms of single frame or casing 24. The frame of FIG. 8 includes a number of spaced parallel members of sheet metal; while FIG. 8A illustrates a sheet metal frame formed with openings therein. FIGS. 8B and 8C illustrate casings formed of wire netting and perforated sheet, respectively.

With use of such frame or casing in secured relation to the support plate, the body-protecting bag can be collapsed with good reproducibility leaving no substantial space around the frame or casing 24; in other words, the body-protecting bag in its normal or collapsed state can have a predetermined internal volume at all times. This means that the gas pressure in the bag 25 when inflated always exhibits substantially the same value. In this manner, it will be appreciated that the bag 25 can attain a definite stable inflated state and maintain such state for a required period of time.

FIG. 9 illustrates a body-protecting device of the present invention as equipped on a high-speed vehicle, e.g., an automobile. The body-protecting bag 25 is shown inflated to hold the rider's body M against inertial movement.

The following examples illustrate the composition of the gas-producing compounds or agents packed in the respective gas-producing tubes 1, 11, 12 and 13 of the embodiment of FIG. 6 and the time duration of gas production of the respective tubes as obtained in the practical experiments conducted therewith.

EXAMPLE 1

| Reference No. of gas-producing tubes | Time duration of gas production effective to keep the protecting bag inflated | Gas-producing compound | | |
|---|---|---|---|---|
| | | Compounding ratio | | Amount, g. |
| 1 | After ignition, 3-20 msec | Boron (5%) / Triplumbic tetroxide (95%) | 1:2 Smokeless powder | 60 |
| 11 | After ignition, 15-50 msec | Boron (5%) / Triplumbic tetroxide (95%) | 1:3 Smokeless powder | 10 |
| 12 | After ignition, 40-200 msec | Boron (5%) / Triplumbic tetroxide (95%) | 1:5 Smokeless powder | 20 |
| 13 | After ignition, 180-500 msec | Smokeless powder | | 20 |

Notes:

i. The gas-producing tubes 1, 11, 12, 13 were each comprised of a receptacle or container packed with the respective gas-producing compound and an electric ignitor therefor.

ii. The gas-producing tubes were each wrapped with a tubular wire net (see FIG. 6) and arranged on a support plate 27 (see FIG. 7), on which are secured a casing 24 of wire netting and a body-protecting bag 25 collapsible thereon and having a volume of 250 liters when inflated.

iii. The electric ignitors were electrically energized to operate the respective gas-producing tubes 1, 11, 12 and 13.

iv. As the consequence, the bag 25 was fully inflated in 23 msec and remained inflated for 550 msec.

EXAMPLE 2

| Reference No. of gas-producing tubes | Time duration of gas production effective to keep the protecting bag inflated | Gas-producing compound | | Amount used, g. |
|---|---|---|---|---|
| | | Compounding ratio | | |
| 1 | After ignition, 3-20 msec | Boron 5%<br>Triplumbic tetroxide (95%) | 1:1 Ammonium perchlorate (66%)<br>Epoxy resin (17%)<br>Vinyl chloride powder (17%) | 80 |
| 11 | After ignition, 15-50 msec | Boron (25%)<br>Potassium nitrate (75%) | 1:1 Ammonium perchlorate (80%)<br>Vinyl chloride powder (20%) | 10 |
| 12 | After ignition, 40-200 msec | Ammonium perchlorate (83%)<br>Polybutadiene (17%) | | 15 |
| 13 | After ignition, 180-500 msec | Ammonium perchlorate (70%)<br>Polyester resin (30%) | | 10 |

Notes:
i), ii), iii) The same as i), ii) and iii) in Example 1.
iv. As the consequence, the bag was fully inflated in 30 msec and remained inflated for 500 msec.

EXAMPLE 3

| Reference No. of gas-producing tubes | Delay time in ignition of gas-producing compound | Delaying compound | | Gas-producing compound | | |
|---|---|---|---|---|---|---|
| | | Composition | Amount, g. | Composition | | Amount, g. |
| 1 | Instantaneous | | | Boron (21%)<br>Potassium nitrate (75%)<br>Polyester resin (4%) | 5:5 Smokeless powder | 20 |
| 11 | 100 msec. delay | Barium peroxide (90%)<br>Lead chromate (10%)<br>Dinitronaphthalene (1.2%)<br>Bonding agent (1.3%) | 5 | Boron (21%)<br>Potassium nitrate (75%)<br>Polyester resin (4%) | 1:4 Smokeless powder | 10 |
| 12 | 250 msec. delay | Barium peroxide (50%)<br>Lead chromate (50%)<br>Dinitronaphthalene (0.6%)<br>Bonding agent (1.2%) | 5 | Boron (21%)<br>Potassium nitrate (75%)<br>Polyester resin (4%) | 1:4 Smokeless powder | 8 |
| 13 | 400 msec. delay | Barium peroxide (45%)<br>Lead chromate (55%)<br>Dinitrohaphthalene (0.6%)<br>Bonding agent (1.2%) | 4 | Boron (21%)<br>Potassium nitrate (75%)<br>Polyester resin (4%) | 1:4 Smokeless powder | 8 |

Notes:
i) Gas-producing tube No.1 was comprised of a container of polyethylene packed with the respective listed gas-producing compound and an electric ignitor therefor. The remaining gas-producing tubes 11, 12 and 13 has each a polyethylene container packed with the respective listed gas-producing compound and further with the listed delaying compound and included an electric ignitor therefor.
ii. The same as (ii) in Example 1 except that the body-protecting bag had a volume of 150 liters when inflated.
iii. The same as ii) in Example 1.
iv. As the consequence, the bag was fully inflated in 40 msec and remained inflated for 600 msec.

As apparent from the foregoing description, the gas-producing device of the invention, comprising a plurality of gas-producing tubes differing from each other in time duration of gas production, is not only capable of rapidly inflating the associated body-protecting bag upon combustion of the gas-producing compound of the initial tube but also is capable of maintaining the inflated state of the bag without any contraction in volume by gas production of the succeeding tubes, and the time of initial inflation of the bag and the period of time that the bag is kept inflated can both be set as desired in order that the bag may be fully prepared in any possible case of collision of the high speed vehicle for protection of the rider's body in advance of the so-called secondary collision.

While particular embodiments of the present invention have been shown and described herein, it will be apparent to those skilled in the art that various changes and modifications may be made without departing from the spirit of the invention or from the scope of the appended claims.

What is claimed is:

1. A gas-producing device for use with an inflatable body-protecting bag on a high-speed vehicle, comprising a plurality of gas-producing members each loaded with gas-producing compound material including an and/or a combustible compound and the material in each member having a different burning velocity for different time durations of gas production, said gas-producing members being simultaneously ignited and being operable in combination to inflate said inflatable bag within a desired period of time and to maintain the latter in its inflated state for a predetermined period of time by combustion gases of said gas-producing compound material.

2. A gas-producing device as claimed in claim 1, in which said gas producing compounds or delaying compounds are comprised of the same ingredients compounded in different ratios.

3. A gas-producing device claimed in claim 1, in which said gas producing compounds or delaying compounds are composed of different kinds of ingredients.

4. A gas-producing device as in claim 1 where a separate electric ignitor is provided for each of said members and an ignitor circuit connects to said electric ignitors in series.

5. A device as claimed in claim 1, in which the material in at least one of said gas-producing members is fast combustible to inflate the body-protecting bag in a desired limited period of time and the material in the remaining gas-producing members is relatively slowly combustible to maintain the inflated state of said body-protecting bag for a predetermined period of time.

6. A device as claimed in claim 1 in which at least the material in one of said gas-producing members is rapidly combustible to inflate the body-protecting bag in a desired limited period of time and the remaining gas-producing members are adapted to produce gases at controlled progressively later times than said fast combustible member material to maintain the body-protecting bag in its inflated state for a predetermined period of time.

* * * * *